(12) United States Patent
Huang et al.

(10) Patent No.: US 12,386,437 B2
(45) Date of Patent: Aug. 12, 2025

(54) ELECTRONIC STYLUS AND ELECTRONIC DEVICE

(71) Applicant: SHENZHEN QIANFENYI INTELLIGENT TECHNOLOGY CO., LTD, Shenzhen (CN)

(72) Inventors: Yanxin Huang, Shenzhen (CN); Liangwu Chen, Shenzhen (CN); Ziyu Zhan, Shenzhen (CN)

(73) Assignee: SHENZHEN QIANFENYI INTELLIGENT TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/658,790

(22) Filed: May 8, 2024

(65) Prior Publication Data

US 2024/0288953 A1   Aug. 29, 2024

Related U.S. Application Data

(63) Continuation of application No. PCT/CN2023/103293, filed on Jun. 28, 2023.

(30) Foreign Application Priority Data

Nov. 17, 2022   (CN) .................... 202223095588.2

(51) Int. Cl.
*G06F 3/0354*   (2013.01)
(52) U.S. Cl.
CPC .............. *G06F 3/03545* (2013.01)
(58) Field of Classification Search
CPC .................................... G06F 3/03545
See application file for complete search history.

(56) References Cited

U.S. PATENT DOCUMENTS

| 2014/0028577 | A1* | 1/2014 | Krah ............ G06F 3/0446 345/173 |
| 2019/0163320 | A1 | 5/2019 | Park et al. |
| 2024/0094834 | A1* | 3/2024 | Lee ............ B43K 29/08 |

FOREIGN PATENT DOCUMENTS

| CN | 110858105 A | | 3/2020 |
| CN | 216817370 U | * | 6/2022 |
| CN | 115079847 A | | 9/2022 |
| CN | 218974892 U | | 5/2023 |

OTHER PUBLICATIONS

International Search Report and Written Opinion issued in corresponding PCT Application No. PCT/CN2023/103293, dated Sep. 28, 2023.

* cited by examiner

*Primary Examiner* — Temesghen Ghebretinsae
*Assistant Examiner* — Ivelisse Martinez Quiles
(74) *Attorney, Agent, or Firm* — Westbridge IP LLC

(57) ABSTRACT

Disclosed are an electronic stylus and an electronic device. The electronic stylus includes: a pen body provided with a control mainboard; a pen core detachably connected to the pen body and configured to make a touch screen produce an electrical signal in response to being in contact with the touch screen; and a plurality of electrodes integrated in the pen core and provided at intervals, and the plurality of electrodes are electrically connected to the control mainboard.

9 Claims, 4 Drawing Sheets

ELECTRONIC STYLUS AND ELECTRONIC DEVICE

CROSS-REFERENCE TO RELATED APPLICATIONS

The present application is a continuation application of International Application No. PCT/CN2023/103293, filed on Jun. 28, 2023, which claims priority to Chinese Patent Application No. 202223095588.2, filed on Nov. 17, 2022. The disclosures of the above-mentioned applications are incorporated herein by reference in their entireties.

TECHNICAL FIELD

The present application relates to the technical field of touch, and in particular to an electronic stylus and an electronic device.

BACKGROUND

The electronic stylus is a small pen-shaped tool that is used to input commands into the computer screen, the mobile device, the drawing tablet, or other devices with a touch screen, and the user can tap the touch screen with the stylus to select a file or a drawing. In order to achieve good writing performance of the electronic stylus, the distance between electrode structures of the electronic stylus, the signal shielding between electrodes, and the size of electrodes are all strictly required.

In related art, the pen core part at the front-end of the existing electronic stylus is usually provided with only one electrode, and the rest of the electrodes are provided inside the pen body. Limited by the shape structure and the internal space of the pen body, the side of the rest of the electrodes cannot be large, so that the performance of the electronic stylus is also limited and cannot be adjusted to the optimal state, which affects the writing performance of the electronic stylus.

SUMMARY

The main purpose of the present application is to provide an electronic stylus and an electronic device, aiming to realize the rational use of the internal space of the pen core at the front end of the electronic stylus, increase the size of the electrode, and improve the writing performance of the electronic stylus.

To achieve the above purposes, the electronic stylus provided in the present application includes:
a pen body provided with a control mainboard;
a pen core detachably connected to the pen body and configured to make a touch screen produce an electrical signal in response to being in contact with the touch screen; and
a plurality of electrodes integrated in the pen core and provided at intervals, and the plurality of electrodes are electrically connected to the control mainboard.

In an embodiment, the plurality of electrodes at least include a first electrode and a second electrode;
the first electrode is a first emitting electrode and is configured to send an electrical signal reflecting a position information of the electronic stylus on the touch screen to the touch screen; and
the second electrode is a second emitting electrode and is configured to send an electrical signal reflecting a tilt angle of the electronic stylus relative to the touch screen to the touch screen.

In an embodiment, the plurality of electrodes at least include a first electrode and a second electrode;
the first electrode is a first emitting electrode and is configured to send an electrical signal reflecting a position information of the electronic stylus on the touch screen to the touch screen; and
the second electrode is a receiving electrode and is configured to receive an electrical signal of the touch screen.

In an embodiment, the electronic stylus further includes:
a third electrode provided on the pen body, and the third electrode is configured to send an electrical signal reflecting a tilt angle of the electronic stylus relative to the touch screen to the touch screen.

In an embodiment, the pen body is provided with an inner thread, an outer periphery of the pen core is provided with an outer thread, and the outer thread is adapted to and screwed with the inner thread.

In an embodiment, the pen core is provided with a first installation groove and a second installation groove provided at intervals with the first installation groove, and the second installation groove is provided at an outer periphery of the first installation groove; and
the first electrode is inserted into the first installation groove, and the second electrode is inserted into the second installation groove.

In an embodiment, the electronic stylus further includes:
a seat provided in the pen body;
a first elastic piece is provided on the seat corresponding to the first electrode, a second elastic piece is provided on the seat corresponding to the second electrode, and the first elastic piece and the second elastic piece are electrically connected to the control mainboard respectively; and
in response to that the pen core is assembled with the pen body, the first elastic piece is electrically connected to the first electrode, and the second elastic piece is electrically connected to the second electrode.

In an embodiment, the second electrode is hollowed and is provided at an outer periphery of the first electrode.

In an embodiment, the first electrode includes a conical head and a solid column connected to the conical head;
the second electrode includes a conical ring, a first hollow column, and a second hollow column connected sequentially; and
the conical ring, the first hollow column, and the second hollow column are provided at intervals on an outer periphery of the solid column.

The present application also provides an electronic device, including:
a touch screen and the electronic stylus, and the touch screen is configured for touching of the electronic stylus.

In the present application, the electronic stylus includes a pen body, a pen core and a plurality of electrodes. A control mainboard is provided in the pen body; the pen core is detachably connected to the pen body, and the pen core is configured for touching the touch screen to generate an electrical signal; the electrodes are integrated in the pen core. The electrodes are spaced apart and are electrically connected to the control mainboard. In this way, a plurality of main electrodes required by the electronic stylus are fronted into the pen core, which increases the layout space of the electrodes without affecting the appearance, and can significantly improve the writing performance of the pen.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
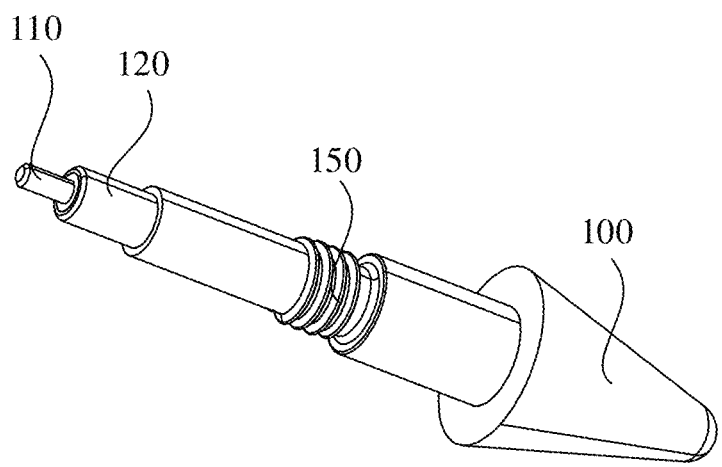
FIG. 1 is a schematic structural view of a pen core of an electronic stylus according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicating the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The electronic stylus is a small pen-shaped tool that is used to input commands into the computer screen, the mobile device, the drawing tablet, or other devices with a touch screen, and the user can tap the touch screen with the stylus to select a file or a drawing. In order to achieve good writing performance of the electronic stylus, the distance between electrode structures of the electronic stylus, the signal shielding between electrodes, and the size of electrodes are all strictly required.

In related art, the pen core part at the front-end of the existing electronic stylus is usually provided with only one electrode, and the rest of the electrodes are provided inside the pen body. Limited by the shape structure and the internal space of the pen body, the side of the rest of the electrodes cannot be large, so that the performance of the electronic stylus is also limited and cannot be adjusted to the optimal state, which affects the writing performance of the electronic stylus.

Referring to FIG. 1 to FIG. 4, the present application provides an electronic stylus.

The electronic stylus includes a pen body 200, a pen core 100 and a plurality of electrodes. A control mainboard is provided in the pen body 200, the pen core 100 is detachably connected to the pen body 200, and the pen core 100 is configured to touch the touch screen to generate an electrical signal. A plurality of electrodes are integrated in the pen core 100 and are provided at intervals, and the plurality of electrodes are electrically connected to the control mainboard.

Specifically, the plurality of electrodes include the main emitting electrode for sending the electrical signal to the touch screen reflecting the positional information of the electronic stylus on the touch screen and the auxiliary emitting electrode for sending the electrical signal to the touch screen reflecting the tilt angle of the electronic stylus relative to the touch screen, or the plurality of electrodes include the emitting electrode for sending the electrical signal to the touch screen reflecting the positional information of the electronic stylus on the touch screen and the receiving electrode for receiving the electrical signal of the touch screen. By fronting the plurality of main electrodes required by the electronic stylus into the pen core 100, the layout space of the electrode is increased without affecting the appearance, and the writing performance of the pen can be significantly improved. The plurality of electrode structural members are merged into a module and are integrated into the pen core 100 structure, and each of the electrodes is separated by insulating materials. Since the electrode is directly made on the pen core 100, compared with that part of the electrode needs to be made inside the pen body 200, the effective area can be greatly increased. Since the pen core 100 is detachably connected to the pen body 200, the pen core 100 can be disassembled and replaced as a whole module, which can improve the assembly and disassembly efficiency, so that the plurality of the main electrodes at the pen core 100 do not need complex assembly operations.

Figure 2:
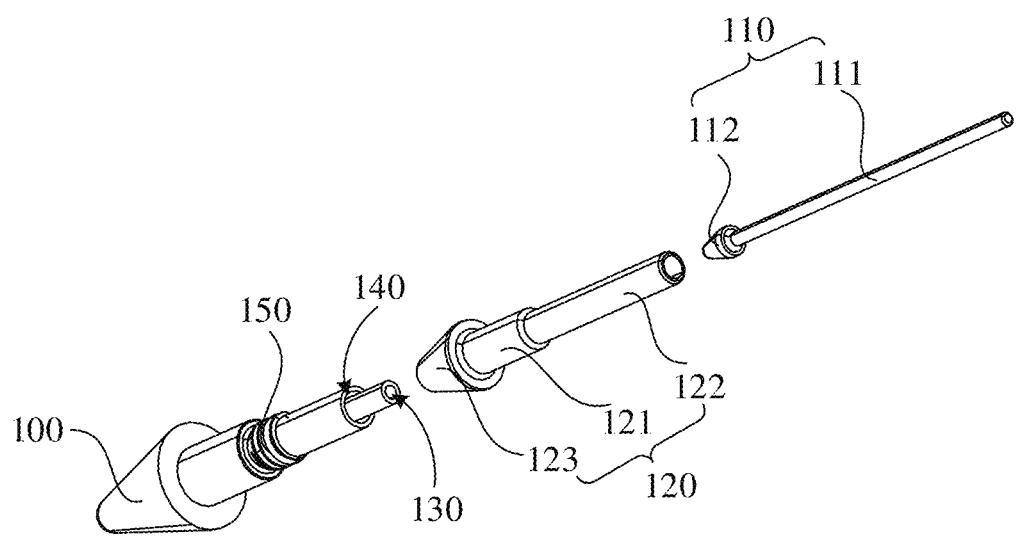
FIG. 2 is an exploded view of the pen core of the electronic stylus according to an embodiment of the present application.
Figure 3:
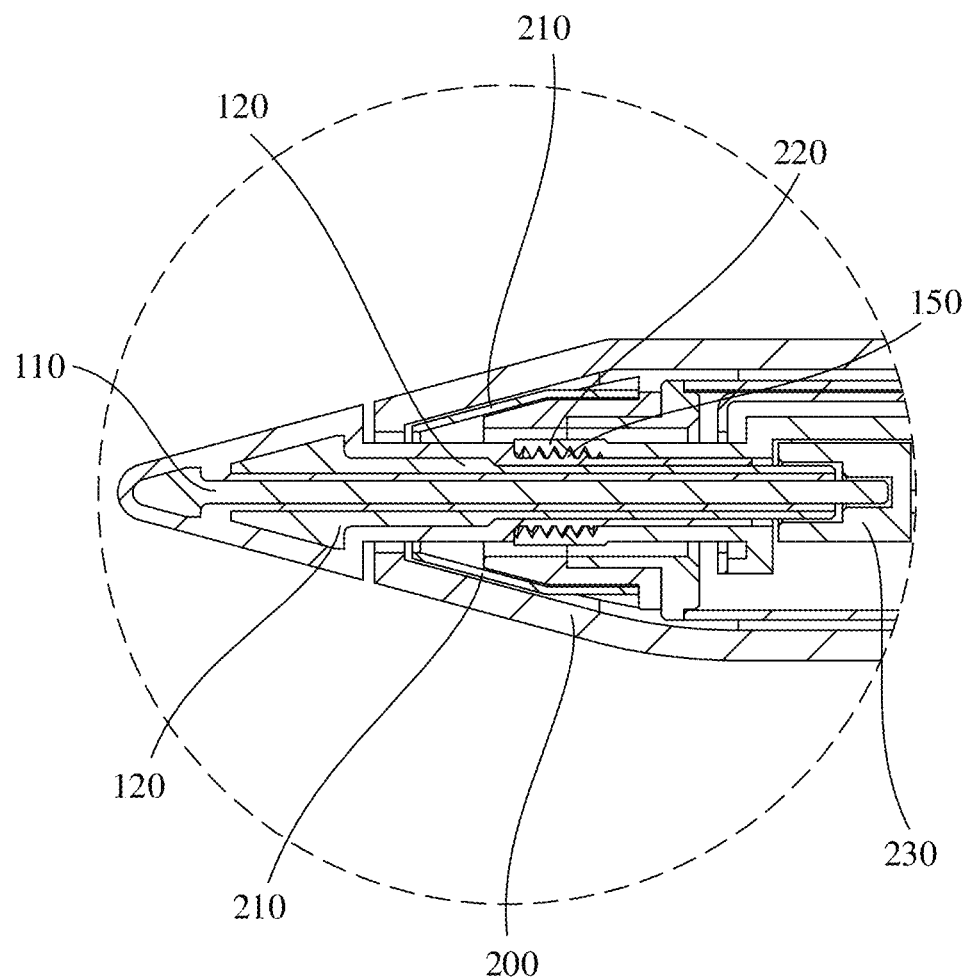
FIG. 3 is a partial cross-sectional view of the electronic stylus according to an embodiment of the present application.
Figure 4:
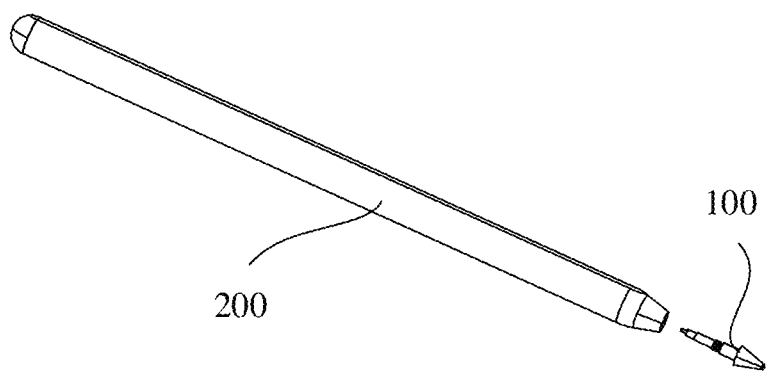
FIG. 4 is an exploded view of the electronic stylus according to an embodiment of the present application.

Referring to FIG. 1 to FIG. 3, in an embodiment, the plurality of electrodes at least include a first electrode 110 and a second electrode 120. The first electrode 110 is the first emitting electrode, and the first electrode 110 is configured to send the electrical signal reflecting the positional information of the electronic stylus on the touch screen to the touch screen. The second electrode 120 is the second emitting electrode, and the second electrode 120 is configured to send the electrical signal reflecting the tilt angle of the electronic stylus relative to the touch screen to the touch screen.

Referring to FIG. 1 to FIG. 3, it is easy to understand that the first electrode 110 and the second electrode 120 are provided in sequence along an axis direction of the pen core 100.

Referring to FIG. 1 to FIG. 3, in an embodiment, the plurality of electrodes at least include the first electrode 110 and the second electrode 120. The first electrode 110 is the first emitting electrode, and the first electrode 110 is configured to send the electrical signal reflecting the positional information of the electronic stylus on the touch screen to the touch screen. The second electrode 120 is the receiving electrode, and the second electrode 120 is configured to receive the electrical signal of the touch screen. Based on the above embodiment, the electronic stylus further includes a third electrode 210 provided on the pen body 200, and the third electrode 210 is configured to send the electrical signal reflecting the tilt angle of the electronic stylus relative to the touch screen to the touch screen. It should be understood that, when the user uses the electronic stylus, the pen core 100 is provided with a nib extending out of the pen body 200. The electronic stylus sends the position information of the touching point to the touch screen through the first electrode 110 of the nib, and sends the tilt angle of the electronic stylus relative to the touch screen through the third electrode 210. The touch screen sends the electrical signal reflecting the position information to the electronic stylus and the tilt angle of the electronic stylus when in use. The second electrode 120 of the electronic stylus provided in the pen core 100, that is, the receiving electrode, receives the electrical signal, and further passes the electrical signal to the control mainboard. The control mainboard processes the electrical signal and transmits it to the pen core 100. The pen core 100 receives the processed electrical signal transmitted from the control mainboard, and performs the instructions carried by the processed electrical signal, so as to draw the points, lines or surfaces on the designated position of the touch screen with thickness and length required by the user. When the user finishes the use of the electronic stylus, it only needs to disconnect the contact between the pen core 100 and the touch screen.

Referring to FIG. 1 to FIG. 4, in order to facilitate the assembly and disassembly of the pen core 100 and the pen body 200, in an embodiment, the pen body 200 is provided with an inner thread 220, the outer periphery of the pen core 100 is provided with an outer thread 150 adapted to and screwed with the inner thread 220. It is easy to understand that the inner thread 220 is connected to the pen core 100, that is, the inter thread 220 is connected to the pen core 100 by threading with the exter thread 150. The outer thread 150 is provided on the outer periphery of the pen core 100, and the volume of the pen core 100 can be further used, which maximizes the available space inside the pen core 100, and increases the effective area of the electrode. The threaded connection method is easy to assemble, and the pen core 100 is highly efficient to replace or disassemble.

Referring to FIG. 3, it is easy to understand that when the exter thread 150 is screwed with the inter thread 220, the first electrode 110, the second electrode 120, and the third electrode 210 are provided in sequence along the axial direction of the pen core 100. When the exter thread 150 is not screwed with the inter thread 220, the third electrode 210 is separated from the first electrode 110 and the second electrode 120.

Referring to FIG. 2, in an embodiment, the pen core 100 is provided with a first installation groove 130 and a second installation groove 140 provided at intervals with the first installation groove 130, and the second installation groove 140 is provided at the an outer periphery of the first installation groove 130. The first electrode 110 is inserted into the first installation groove 130, and the second electrode 120 is inserted into the second installation groove 140. The shape of the first installation groove 130 is adapted to the shape of the first electrode 110, and the shape of the second installation groove 140 is adapted to the second electrode 120. For example, if the first electrode 110 and the second electrode 120 are both arranged as conical rings 123, then the first installation groove 130 and second installation groove 140 are also arranged as the conical rings 123.

Referring to FIG. 3, in an embodiment, the electronic stylus further includes a seat 230 provided in the pen body 200. A first elastic piece is provided on the seat 230 corresponding to the first electrode 110, and a second elastic piece is provided on the seat 230 corresponding to the second electrode 120, and the first elastic piece and the second elastic piece are electrically connected to the control mainboard. When the pen core 100 is assembled with the pen body 200, the first elastic piece is electrically connected to the first electrode 110, and the second elastic piece is electrically connected to the control mainboard. The first elastic piece and the second elastic piece are elastic. During the assembly process, the first elastic piece is in an interference fit with the first electrode 110, and the second elastic piece is in an interference fit with the second electrode 120 to maintain the good electrical contact. In this way, when the pen core 100 is assembled to the pen body 200, the first electrode 110 and the second electrode 120 on the pen core 100 can be connected to the internal circuit of the pen body 200.

Referring to FIG. 1 to FIG. 3, the first electrode 110 and the second electrode 120 need to be separated. In an embodiment, the second electrode 120 is hollowed, and the second electrode 120 is provided at intervals on the outer periphery of the first electrode 110, which makes full use of the internal space of the pen core 100, and makes sure that the second electrode 120 is not in contact with the first electrode 110.

Referring to FIG. 2, in an embodiment, the first electrode 110 includes a conical head 112 and a solid column 111 connected to the conical head 112. The second electrode 120 includes the conical ring 123, a first hollow column 121, and a second hollow column 122 that are connected sequentially. The conical ring 123, the first hollow column 121, and the second hollow column 122 are provided at intervals on the outer periphery of the solid column 111. The second hollow column 122 is also extended from the solid column 111 towards a tail of the pen core 100. When the pen core 100 is assembled to the pen body 200, the second hollow column 122 and the solid column 111 conduct the internal circuit of the pen body 200.

In an embodiment, the pen core 100 is made of plastic material. Referring to FIG. 1, in an embodiment, the end of the pen core 100 is arranged as rounded corners. It should be noted that if the end of the pen core 100 configured to contact the touch screen is at a sharp angle, the pen core 100 is stressed and can easily scratch the touch screen. The rounded corners make the contact between the electronic stylus and the touch screen smoother and prevent scratching the touch screen.

Referring to FIG. 1 to FIG. 4, the present application further provides an electronic device, including a touch screen and an electronic stylus. The touch screen is configured for the touching of the electronic stylus. The electronic stylus includes a pen body 200, a pen core 100 provided with a control mainboard and a plurality of electrodes. The pen core 100 is detachably connected to the pen body 200, and is configured to make the touch screen produce an electrical signal when it is contact with the touch screen. The plurality of electrodes are integrated in the pen core 100 and are provided at intervals, and the plurality of electrodes are electrically connected to the control mainboard. Since the electronic device adopts all the technical solutions of all the above embodiments, it also has all the beneficial effects brought about by the technical solutions of the above embodiments, which will not be repeated herein.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields, are included in the scope of the present application.

What is claimed is:

1. An electronic stylus, comprising:
a pen body provided with a control mainboard;
a pen core detachably connected to the pen body and configured to make a touch screen produce an electrical signal in response to being in contact with the touch screen;
a plurality of electrodes integrated in the pen core and provided at intervals, wherein each of the plurality of electrodes is separated by insulating materials, and the plurality of electrodes are electrically connected to the control mainboard; wherein the plurality of electrodes at least comprise a first electrode and a second electrode; and
a seat provided in the pen body,
wherein a first elastic piece is provided on the seat corresponding to the first electrode, a second elastic piece is provided on the seat corresponding to the second electrode, and the first elastic piece and the second elastic piece are electrically connected to the control mainboard respectively; and
in response to the pen core being assembled with the pen body, the first elastic piece is electrically connected to the first electrode, and the second elastic piece is electrically connected to the second electrode.

2. The electronic stylus of claim 1, wherein
the first electrode is a first emitting electrode and is configured to send an electrical signal reflecting a position information of the electronic stylus on the touch screen to the touch screen; and
the second electrode is a second emitting electrode and is configured to send an electrical signal reflecting a tilt angle of the electronic stylus relative to the touch screen to the touch screen.

3. The electronic stylus of claim 2, wherein the pen core is provided with a first installation groove and a second installation groove provided at intervals with the first installation groove, and the second installation groove is provided at an outer periphery of the first installation groove; and
the first electrode is inserted into the first installation groove, and the second electrode is inserted into the second installation groove.

4. The electronic stylus of claim 3, wherein the second electrode is hollowed and is provided at an outer periphery of the first electrode.

5. The electronic stylus of claim 4, wherein the first electrode comprises a conical head and a solid column connected to the conical head;
the second electrode comprises a conical ring, a first hollow column, and a second hollow column connected sequentially; and
the conical ring, the first hollow column, and the second hollow column are provided at intervals on an outer periphery of the solid column.

6. The electronic stylus of claim 1, wherein
the first electrode is a first emitting electrode and is configured to send an electrical signal reflecting a position information of the electronic stylus on the touch screen to the touch screen; and
the second electrode is a receiving electrode and is configured to receive an electrical signal of the touch screen.

7. The electronic stylus of claim 6, further comprising:
a third electrode provided on the pen body, wherein the third electrode is configured to send an electrical signal reflecting a tilt angle of the electronic stylus relative to the touch screen to the touch screen.

8. The electronic stylus of claim 1, wherein the pen body is provided with an inner thread, an outer periphery of the pen core is provided with an outer thread, and the outer thread is adapted to and screwed with the inner thread.

9. An electronic device, comprising:
the touch screen and the electronic stylus of claim 1, wherein the touch screen is configured for touching of the electronic stylus.

* * * * *